United States Patent [19]
Janus

[11] Patent Number: 5,417,266
[45] Date of Patent: May 23, 1995

[54] BELT PLY FOR PNEUMATIC TIRES INCLUDING TRANSVERSE EXTENSION ZONES

[75] Inventor: Jonny Janus, Düsseldorf, Germany

[73] Assignee: Tyre Consult Venlo B.V., Venlo, Netherlands

[21] Appl. No.: 74,595

[22] Filed: Jun. 11, 1993

Related U.S. Application Data

[63] Continuation of Ser. No. 941,217, Sep. 4, 1992, abandoned, which is a continuation of Ser. No. 404,987, Sep. 11, 1989, abandoned.

[30] Foreign Application Priority Data

Sep. 9, 1988 [EP] European Pat. Off. ............ 88114718

[51] Int. Cl.$^6$ ............................................. B60C 9/18
[52] U.S. Cl. ................................. 152/200; 152/526; 152/538
[58] Field of Search .............. 152/526, 530, 516, 200, 152/201, 533, 537, 538

[56] References Cited

U.S. PATENT DOCUMENTS

| | | | |
|---|---|---|---|
| 549,059 | 10/1895 | Cochran | 152/200 |
| 927,355 | 7/1909 | Karlström | 152/200 |
| 1,227,673 | 5/1917 | Rouse | 152/200 |
| 1,228,001 | 5/1917 | Demas | 152/200 |
| 1,251,017 | 12/1917 | Hann | 152/200 |
| 1,428,726 | 9/1922 | Warth | 152/530 |
| 4,111,249 | 9/1978 | Markow | 152/530 |

FOREIGN PATENT DOCUMENTS

| | | | |
|---|---|---|---|
| 0191124 | 3/1985 | European Pat. Off. | . |
| 264539 | 4/1988 | European Pat. Off. | 152/526 |
| 357826 | 3/1990 | European Pat. Off. | 152/526 |
| 1194720 | 10/1957 | Germany | . |
| 2355489 | 11/1973 | Germany | . |
| 04862 | 8/1986 | WIPO | 152/526 |

*Primary Examiner*—Geoffrey L. Knable
*Attorney, Agent, or Firm*—Foley & Lardner

[57] ABSTRACT

A belt ply for pneumatic tires including at least one ring of sheet or strip material extending in the circumferential direction of the tire. These rings include extension zones formed of undulations, projections or recesses, extending transversely to the circumferential direction of the tire. The rings additionally include notches or recesses of defined length extending in the circumferential direction to improve the flexibility of the tire in the extension zones.

11 Claims, 2 Drawing Sheets

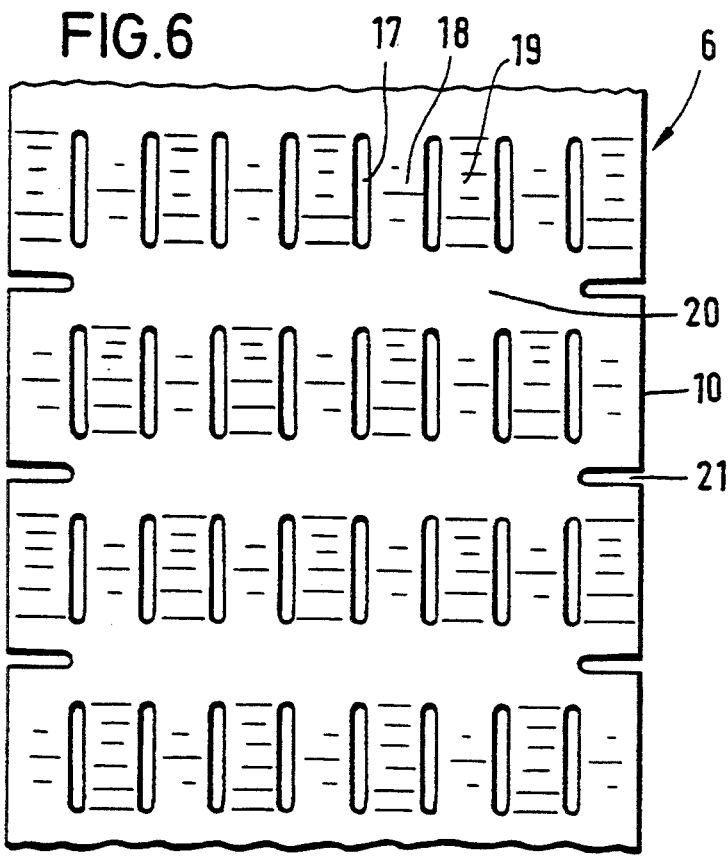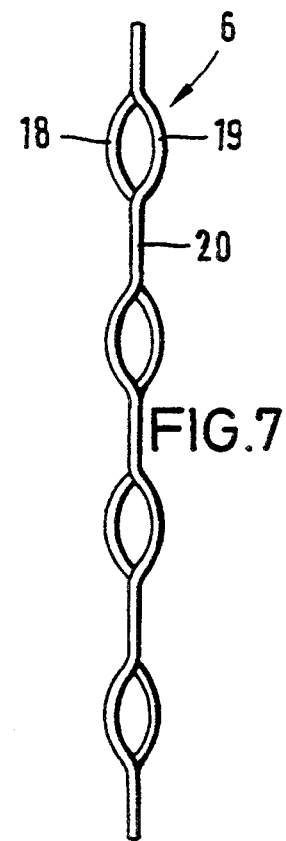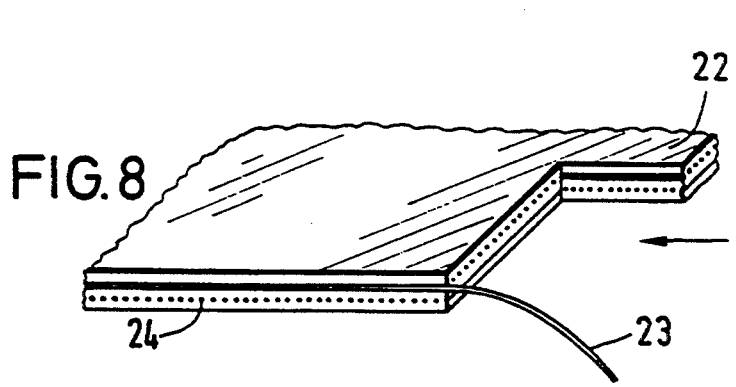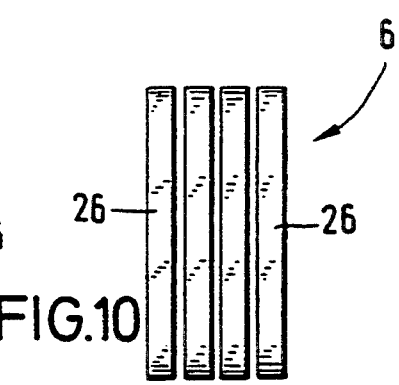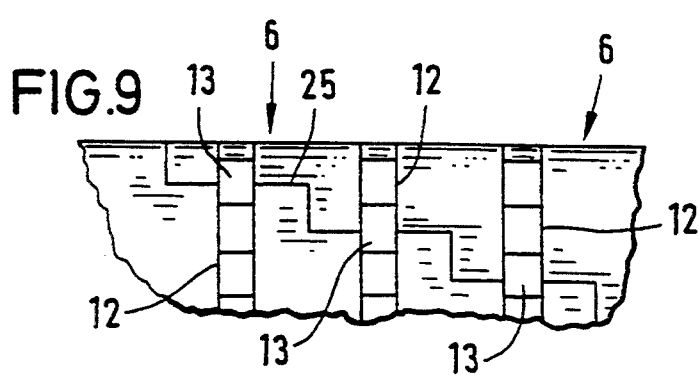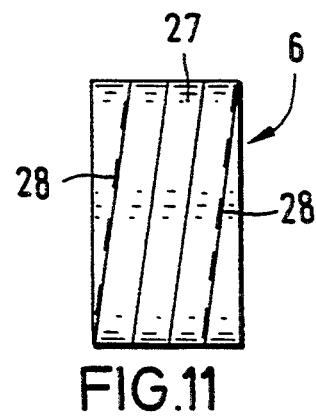

BELT PLY FOR PNEUMATIC TIRES INCLUDING TRANSVERSE EXTENSION ZONES

This application is a continuation of application Ser. No. 07/941,217, filed Sept. 4, 1992, now abandoned, which is in turn a continuation of application Ser. No. 07/404,987, filed Sept. 11, 1989, now abandoned.

BACKGROUND OF THE INVENTION

The invention relates to a radially deformable belt ply for pneumatic tires which has at least one ring of sheet or strip material extending in the circumferential direction of the tire, and which comprises extension zones, such as undulations and/or projections or recesses, which extend transversely to the direction of rotation of the tire.

Belt plies of this kind are known (EP 0 191 124 A1) but, in this case, the ring, which is, for example, designed to be undulate, solely serves the purpose of producing the desired transverse rigidity, whereas additional strength-supporting means are provided for circumferential rigidity.

On the other hand, annular belt plies for pneumatic tires are known (DE-A-1 194 720 and DE-A-2 355 489) which are both extension- and pressure-resistant. The notches and/or recesses provided in these belt plies, which have a relatively great or deep thickness, serve the purpose of permitting the penetration of the surrounding rubber material of the pneumatic tire and, possibly, of improving the flexibility at the edges, but they should not influence the strength and rigidity in the circumferential direction. It is for this reason, that these known belt plies are not able to follow, resiliently, the linear variations of the pneumatic tire equipped with such a belt ply when it passes through the tire-tread region, with the result that pneumatic tires equipped with such belt plies wear relatively rapidly due to distinct displacements of the material from the tread region into the non-loaded circumference and due to small bending radii in the rolling humps and upright waves, and disintegrate as a result of the temperatures consequently arising in the polymer material, and also do not provide a pleasant travelling comfort. In addition, these known belt plies cannot perform the local radial deformations in the tread region from the cylindrical form of the firm belt ply, which are required in practice.

SUMMARY OF THE INVENTION

The invention is based on the object of improving an annular belt ply of the kind mentioned at the outset such that it, on the one hand, .ensures both the desired transverse rigidity as well as the desired circumferential stability of the pneumatic tire fitted with such a ply, but, on the other hand, that it also ensures that pneumatic tires fitted with such a belt ply have, in their practical application, an adequate elasticity in the tread or flattening region of the pneumatic tire, so that there are no harmful relative movements between the rubber particles and the track, and all deformations are absorbed and transmitted without troublesome effects on the pneumatic tire and without adversely affecting the travelling comfort of a vehicle provided with such pneumatic tires.

According to the invention, this object is met in a belt ply of the kind mentioned, in that the ring of this ply comprises apertures or recesses of defined size which extend in its circumferential direction and transverse direction. Viewed in the circumferential direction, the belt ply has interspaced extension zones, for example, in the form of meanders or waves, between more or less non-extending zones, so that a functionally extended annular ply provides both the desired circumferential rigidity with simultaneous transverse reinforcing and, in addition, a certain reshaping in the tread region of an appropriately equipped pneumatic tire. An extremely light-weight belt ply is, therefore, obtained which provides an exceptionally high moment of resistance in the tread region of the pneumatic tire, owing to its discoid shape in the transverse direction, and which optimally meets all the requirements of such a ply.

Extensive bench tests have shown that the steering accuracy and side-sway stability of pneumatic tires are determined not only by the properties of the pneumatic-tire belt plate which passes through the tire-tread chord. Indeed, the characteristic property of the non-loaded tire circumference also plays a distinct part.

Belt structures, such as steel cord plies which extend crosswise, have correspondingly numerous degrees of freedom for lateral deformations, as a result of the countless rubber bridges between the individual strength-supporting means.

In contrast, the homogeneous and, preferably, one-piece belt ply, according to the invention, produces, on both sides of the flattened belt chord, "half shells" which, under the radially active working conditions, are affixed such that lateral deformations are practically not possible. As a result, an accurate and form-true linkage of the loaded belt plate and the non-loaded circumferential portion of the pneumatic tire is ensured since, under these conditions, lateral deformations would be possible only via changes of the radius. This is, however, prevented by the circumferential rigidity of the pneumatic tire.

The apertures or recesses of the belt ply according to the invention are preferably located in the region of the undulations and/or projections or recesses. As a result, the belt ply has, between the sections which are flexible to a limited extent in the circumferential direction, non-interrupted zones which provide a high degree of stability. The recesses may be gaps in the projections or recesses extending in the transverse direction of the ring, but may also be notches starting from the sides, such that the belt ply also has an adequate deformability even in the shoulder regions of the pneumatic tire, in order to adapt without difficulty to the shape of the cambered pneumatic tire.

In contrast to the known extension- and pressure-resistant belt plies (DE-A-1 194 720 and DE-A-2 355 489), the invention takes into account that the belt structure must be able, in the circumferential direction of an appropriately fitted radial-ply tire, to be adapted to the linear variations of the tire circumference when passing through the flattening zone of the tire in the tread region.

Thus, in the case of a single-piece design of the belt ply, it is possible to obtain a defined deformation and, therefore, a limited extensibility and reshaping or overshaping, also by providing, in the extension zones or undulations and/or projections or recesses, parallel longitudinal slits or apertures, and by bulging out, alternately to the one or other side, the sections of the belt or ring disposed between adjacent longitudinal slits or apertures. On the other hand, it is also possible to provide the projections or recesses with notches which interrupt the projections or recesses.

It is also possible that the different properties of the materials of the belt ply, which together form a composite, result in the desired extension and reshaping. In the case of a composite material, a compression or upsetting is, however, impossible. This form of embodiment presupposes a reversible extension of the ring or belt ply of about 5%.

Ideally, a single-layer belt ply having a thickness of, for example, 0.6 mm, can be arranged immediately below the rubber running tread such that the cycloidal rolling of the tread circumference of the belt structure extends virtually identically with the outside circumference of the running tread. Since this advantageously results in only very small displacements of the contact points of the two cycloids, it is also only correspondingly minor distortions that occur between the belt structure and the upper surface of the running tread, which can, in turn, be compensated for so advantageously by the greater form-slipping potential, which results from the preforming of the belt ply or its defined flexible extension and the corresponding reshaping, that, under normal operating conditions, practically no slipping can take place between the rubber surface of the running tread and the track. The result is a substantially better dry-, wet-, ice- and snow-gripping behaviour. In addition, as a result, the load transmission is increased and the abrasion of the rubber and noise generation are reduced.

If the annular belt ply according to the invention is selected to be extremely thin, e.g. 0.1 mm or less, for example, merely to obtain good handling and lateral-guiding properties, the desired characteristic property is available for this purpose due to the high moment of resistance of the belt ply flattened to form a disc.

In such a case, however, the available supporting cross-section is not in itself sufficient to ensure the necessary circumferential rigidity or to resist the multi-axial tension and deformation attacks, in each case in the transition from the non-loaded circumference to the belt plate in the tread region or in the run-in and run-out regions.

By means of suitable reinforcing, e.g. a 90° cord ply, which may be composed of steel or which may have textile strength-supporting means, for the reduction of multi-axial tension or deformation attacks, the extremely light-weight but nevertheless laterally rigid belt ply according to the invention can be made available for its actual function.

It is possible, in association with the high degree of freedom, according to the invention, of radial deformability of the belt ply, to give the tire specific characteristics by differing dimensions of the physical structure. Thus, for example, an overall non-rigid belt structure can be designed specifically for steering movements of the pneumatic tire by the specific limitation of the edges against extension.

On the other hand, due to its lateral moment of resistance, an already laterally-rigid belt can be substantially optimized, without thereby becoming more direct, in its straight-forward running properties, in particular in its dry and wet gripping, by reinforcing the elastic properties of the central running-tread region.

Although, in many cases, a single ring of sheet or strip material is adequate for the belt ply, it is also possible to provide a plurality of such rings in juxtaposed or superposed layers or continuously coiled in one layer. The important point is that each ring permits an adequate extension, due to its configuration, preshaping or construction, so as to be able to follow resiliently or to transmit the deformation of the appropriately fitted tire during practical operations and, in particular, in the tread region. Combinations with other strength-supporting means of a belt ply are also possible.

The design of the belt ply according to the invention is selected such that no harmful stress peaks arise in the tire. Operation-related "restraints" between wheel load and roadway transfer even extremely great lateral forces substantially free of deformations.

The projections and recesses or beading, which extend transversely to the circumferential direction of the annular belt ply, are expediently perforated such that their radially active reinforcing is partially interrupted. At these points, the belt can be radially deformed without the danger of stress cracking, e.g. when an appropriately fitted pneumatic tire travels over stones, sharp edges or the like, without thereby adversely affecting the high degree of lateral rigidity. These advantages also permit a problem-free convex swelling of the moulded tire blank during production.

Between the preformed projections or recesses, which are interrupted by perforations, are disposed smooth, flat sections of the ring which serves as strength-supporting means, which sections can be bent radially in all directions but which act as a disc in their plane and thus provide a strong moment of resistance to lateral deformations.

Although the ring, of homogeneous sheet or strip material, e.g. steel or polyamide, can be manufactured as a single piece, it is also possible to form the strip material from a composite which is reinforced with fibres or threads. The important point, in this case, is that, owing to the properties of its material or the character of its surface, the belt ply is connected, permanently, intimately and without the danger of separation, to the rubber material of a pneumatic tire, without this necessitating recesses and/or notches, although these would not be harmful.

Since, in the belt ply according to the invention, the sheet- or strip-shaped ring, which extends in the circumferential direction, extends across the entire width of the running tread of an appropriately fitted pneumatic tire and may, possibly,-also extend beyond the shoulders into the flanks of-this pneumatic tire, there results a high degree of lateral rigidity or transverse rigidity because, for example, the radially and towards the centre approximately U-shaped cross-section is anchored with its edges outside the circumferentially loaded running tread on the strength-supporting means of the carcass, with the result that no troublesome relative movements take place between non-perforated sections which extend parallel to one another between the perforated notches. Such a belt ply also provides a high degree of torsional rigidity without resulting in undesirable deformations when under the influence of lateral forces. The circumferential function of the belt ply, i.e. the flexibly defined extension and reshaping and even limited overshaping, is ensured without danger of material breakages and plastic or permanent deformations.

The biasing of an appropriately equipped pneumatic tire and travel across unevennesses, even sharp-edged obstacles, is considerably facilitated by the radial preforming. The belt ply according to the invention has a high degree of radial freedom, with the result that both [SIC] an originally convex shape of the belt can become flat in the flattening region without the belt ply undesirably inhibiting such movements.

The belt ply according to the invention thus provides appropriately equipped pneumatic tires with the desired stability without adversely affecting the flexible elastic movements of the tire, or the components thereof, required during practical operations.

High-strength materials with extremely small thicknesses of, for example, 0.06 mm can be used for the belt ply according to the invention, it being possible for the ply to be composed of metal such as steel, but also of polyamide foil or the like.

At the joints of a ring or belt formed from a sheet or strip, there may be provided stepwise staggered connecting seams or joints, or connections which extend at a small angle relative to the circumferential direction.

As stated above, the belt ply may be single-layered or multi-layered. Any ring which serves as strength-supporting means provides both the desired circumferential rigidity as well as the transverse rigidity which is, likewise, desired but, on the other hand, is able to participate, in the tire-tread region of the appropriately equipped pneumatic tire, in the required change in the circumferential length from a circular-arc segment to a flattened-off region. The belt ply is thus also elastically extensible and restorable, with the result that it, as a tangential spring, takes up energy during extension and releases it again in the tread region of the pneumatic tire, for contraction. This ensures an energy-conserving operating method. By the preshaping, on the other hand, it is prevented that the belt ply can become warped during practical operations as a result of upsetting deformations and provoke internal destruction of the pneumatic tire.

Due to the particular geometry of the belt ply according to the invention, materials which are, as such, inherently stable, such as steel or hard synthetic materials in extremely small thicknesses, can be used in the manufacture of the annular belt ply.

Although, in the case of a belt ply for pneumatic tires, the central portion, which is disposed in the region of the running tread of the pneumatic tire, is of crucial importance for the stability of the pneumatic tire, the lateral regions at the shoulders also play a part which cannot be neglected. Thus, the circumferential extension of the edges of the belt ply according to the invention can be limited, relative to the central region, for example by bracing the edges with applied materials which are moderately extensible or even by extending the edges into the shoulder and flank regions of the pneumatic tire. As a result of these measures, relatively different deformations are largely prevented in the adjacently extending extension zones, with the result that the non-perforated, flatly extending portions of the ply extend virtually parallel to one another. As a result, on the one hand, the lateral rigidity of the pneumatic tire is improved beyond the upper moment of resistance and, on the other hand, the possibility of torsional deformation of the entire belt ply is reduced.

All in all, the invention proposes a belt ply which, in comparison with known belt plies, has, on the one hand, a high circumferential strength with, at the same time, adequate extensibility and reshaping ability and, on the other hand, provides the required transverse rigidity because the belt ply has at least one ring which extends across the entire width of the running tread and, optionally, even into the flank region of the corresponding radial tire, and which takes up both the circumferential forces as well as the lateral forces and any torsional forces which may arise.

The belt layer according to the invention increases the form-slipping potential of an appropriately equipped tire in comparison to known pneumatic tires by at least 10%, both in the longitudinal and in the transverse direction.

The improved form-slipping potential of the belt structure obtained constructively by the belt ply according to the invention compensates for distortions from a lateral displacement of the points of contact of the cycloids of tread circumference and running-tread circumference of the appropriately equipped pneumatic tire, up to 10% of the chord in the tread region of the pneumatic tire.

The joint of the annularly designed belt ply, i.e. the point at which the ends of the bands or strips which have been placed in position to form a ring abut against each other, is offset or designed to extend at an angle of less than 90° with respect to the circumferential direction, so that the joint does not suddenly run into the flattening region of the pneumatic tire, thereby causing overstressing and damage to the tire material.

The edges of the annular belt ply are, for example, designed to be more resistant to extension than the central region, i.e. less extensible than the central region. This can be brought about, for example, in that the edges of the annular belt ply are braced by elastically extensible material, for example by thread or yarn material.

On the other hand, it is also possible to design or to protect the central region of the annular belt ply against extension to a greater extent than the edge regions which can be achieved, for example, in that the central region of the annular belt ply is braced by elastically extensible material to a greater extent than the edge regions. In this case, too, the elastically extensible material can be thread or yarn material.

According to a further feature of the invention, the edges of the annular belt ply can be guided across the shoulder regions of the appropriately equipped pneumatic tire into the lateral flanks of the tire and, in so doing, can be supported directly on the strength-supporting means of the carcass of the tire, outside the running-tread region of the pneumatic tire. In this form of embodiment of the belt ply according to the invention, the lateral parts of the ply extend into regions of the pneumatic tire which are free of tangential forces and stresses and in which the carcass can bulge laterally.

In order to adjust without difficulty to the cambered shape of the pneumatic tire, the lateral portions of the belt ply are, in the case of this form of embodiment, designed to be slit or provided with notches which extend perpendicularly to the circumferential direction of the belt ply.

According to a different form of embodiment of the invention, the belt ply is wound continuously from edge to edge of the ply by a narrow strip. In so doing, only the beginning or end of the strip may be connected, for example welded, to the adjacent layer of the winding. Protruding edges and corners can be removed after completion of the belt ply.

The belt ply according to the invention expediently assumes the form of a flat cylinder between the shoulders of the appropriately equipped pneumatic tire, even in the case of a convex design, under the operation-related extension in the running-tread region or tread-contact region of the pneumatic tire.

The ring of the belt ply according to the invention, which ring is cylindrical in the extended state of the pneumatic tire, can, in the reshaped state, undergo any cross-sectional deformations in the tread-contact region, for example when travelling across unevennesses, etc.

According to a further feature of the invention, the beading or projections and recesses, which are transversely interrupted by the perforations or divided into segments, of the belt ply according to the invention, can be extended differently from one another, with the result that spatially defined deformations are also possible without adverse influences on other regions of the belt ply and the appropriately equipped pneumatic tire.

BRIEF DESCRIPTION OF THE DRAWINGS

In the drawings, exemplified embodiments of the belt ply for a pneumatic tire, according to the invention, are diagrammatically illustrated, as follows:

FIG. 6 shows a partial plan view of yet a further embodiment of the belt ply according to the invention, FIG. 7 shows a lateral view of the belt ply of FIG. 6, FIG. 8 shows a diagrammatic partial view of a further form of embodiment of the belt ply according to the invention, FIG. 9 shows a plan view of the annular belt ply, according to the invention, in the region of the joint, FIG. 10 shows a view of a belt ply, according to the invention, formed by parallel strips, FIG. 11 shows a view of a belt ply, according to the invention, formed by a continuously wound strip.

DETAILED DESCRIPTION OF THE EMBODIMENTS OF THE INVENTION

Figure 1:
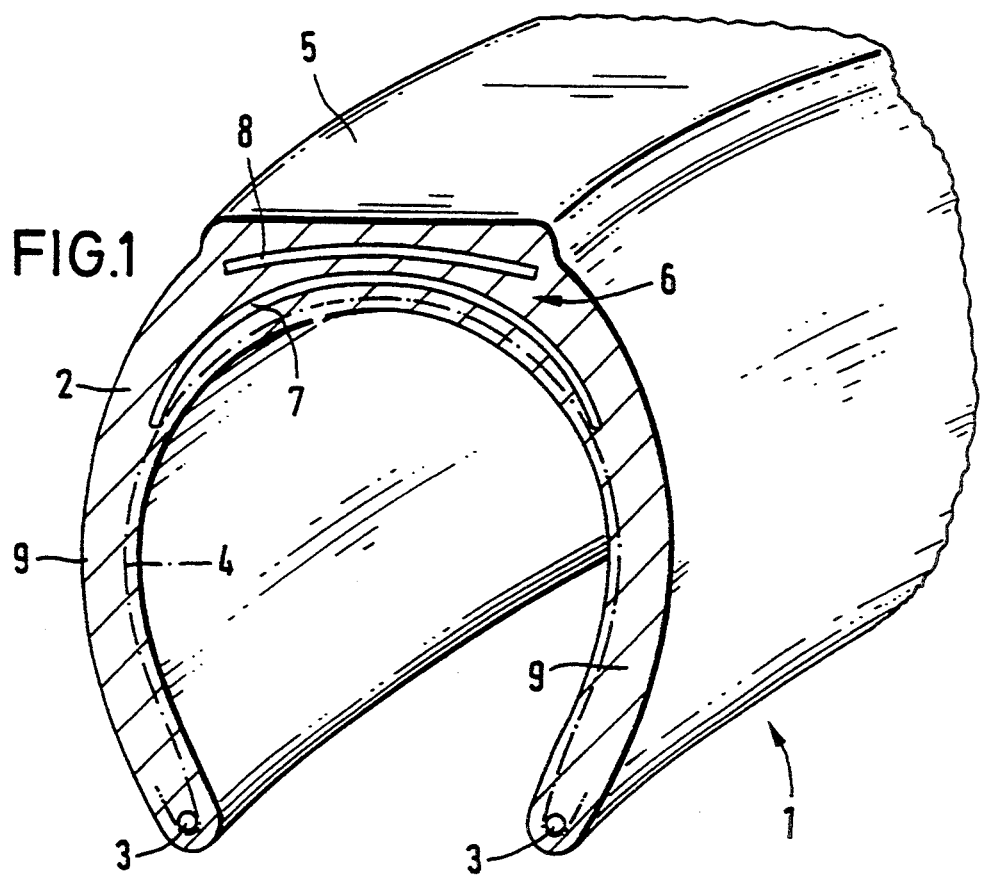
FIG. 1 shows a diagrammatic partial sectional view of a pneumatic tire for vehicles equipped with a belt ply according to the invention.

In FIG. 1, a pneumatic tire (1) for vehicles is illustrated which has a toroidal body (2) of rubber material and which contains a core ring (3) in the region of each of its two beadings. Embedded in the toroidal body (2) is a carcass (4) of conventional design, the ends of which carcass are guided about the two core rings (3) of the beadings.

In the region of the tread surface (5) of the pneumatic tire (1), there is located above the carcass (4) a belt ply (6) which, with its edge regions (7), extends into the lateral flanks (9) of the pneumatic tire (1) and is supported there on the carcass (4).

A rubberized cord ply (8), which supports the belt ply (6), is disposed between the belt ply (6) and the tread surface (5) of the pneumatic tire (1).

Figure 2:
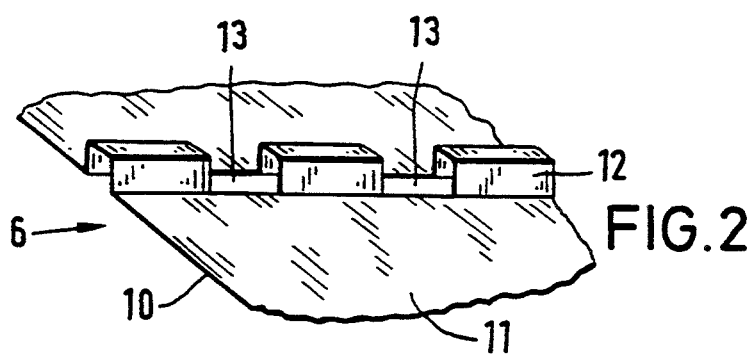
FIG. 2 shows a diagrammatic partial view of an embodiment of the belt ply according to the invention.

In the form of embodiment illustrated in FIG. 2, the belt ply (6) comprises a flexible, yet planarly inherently stable sheet (10) which extends across the entire width, and which has elevations (12) which are arranged between smooth or flat portions (11) and which are, in the exemplified embodiment illustrated, designed to be U-shaped but which may also be designed to be curved. The elevations (12) contain parallel spaced cutouts (13) which impart a measure of lateral flexibility to the elevations (12) which serve as extension zones.

Figure 3:
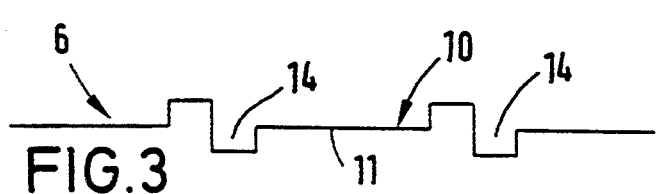
FIG. 3 shows a lateral view of an embodiment of the belt ply according to the invention.

In the form of embodiment according to FIG. 3, the extension zones of the sheet (10) are designed to be combined projections and recesses (14). These projections and recesses can, likewise, comprise cutouts (13) which are, however, not distinguishable in the drawing.

Figure 4:
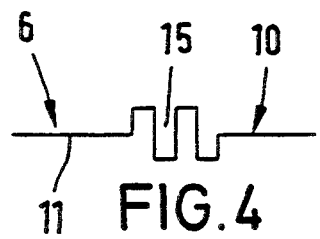
FIG. 4 shows a lateral view of another embodiment of the belt ply according to the invention.

In the form of embodiment according to FIG. 4, the sheet (10) of the belt ply (6) comprises a modified form of projections and recesses (15) but is, for the rest, of similar design as the forms of embodiment according to FIGS. 2 and 3.

Figure 5:
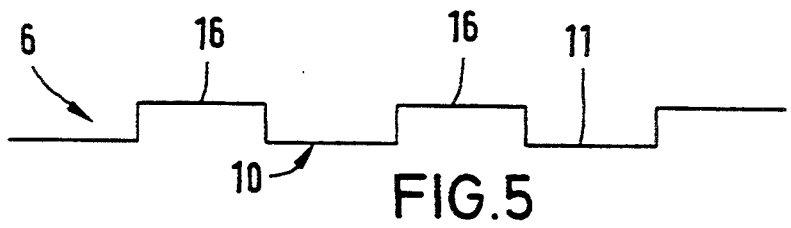
FIG. 5 shows a lateral view of a further embodiment of the belt ply according to the invention.

Whereas the flat portions (11) of the sheet (10) which, in the forms of embodiment according to FIGS. 2 to 4, are disposed between the elevations (12) or projections and recesses (14 and 15), are relatively large and long relative to the elevations or projections and recesses, the elevations (16) of the belt ply (6) in the case of the form of embodiment according to FIG. 5 are approximately equally wide or long as the straight or flat portions (11) of the sheet (10) located between said elevations. But, in this case too, the elevations (16) may comprise cutouts, which are not illustrated, as the cutouts (13) according to FIG. 2.

In all forms of embodiment, the elevations or projections and recesses are, in a front view, rectangularly designed. A rounded-off or flattened form of embodiment of the elevations or projections and recesses is, however, also possible. What is essential is that, between portions (11) which extend straight and flat, extension zones are formed by elevations or projections and recesses.

In the embodiment according to FIGS. 6 and 7, the belt ply (6) is again formed by a sheet (10) which, however, in contrast to the forms of embodiment described above, comprises rows of notches (17) which extend in the longitudinal direction or circumferential direction of the annular belt layer (6). Projections (18) and recesses (19), which are raised above the basic shape of the sheet (10) in opposite directions as is shown in FIG. 7, are alternately formed between the notches (17). These oppositely directed projections (18) and recesses (19) form the desired extension zones having the likewise desired flexibility. In the case of this form of embodiment, too, flat or rectilinearly extending portions (20) of the sheet (10) are disposed between the rows of notches (17). Further notches (21) start from the longitudinal edges of the sheet (10) and extend perpendicularly to the circumferential direction of the annular belt ply (6) and are intended for the purpose of deforming the lateral regions of the sheet (10) such that they are more readily able to adjust to the curvature of the toroidal pneumatic tire (1) in the edge region of the tread surface (5) thereof or in the region of the flanks (9).

In the case of all forms of embodiment described above, the sheet (10) of the belt ply (6) can be composed of synthetic material, such as relatively hard synthetic material, because it can be designed to be extremely thin. It is, however, also possible to provide the sheet (10) in the form of a thin metal sheet.

In the form of embodiment according to FIG. 8, the belt ply (6) is formed by a strip-like matrix system (22) which comprises extensible threads (23) which extend in the circumferential direction of the belt ply, and extension-resistant threads (24) which extend in the transverse direction of the belt ply (6), which are embedded in a substance which bonds well with the rubber material of the pneumatic tire. For the rest, the belt ply (6) of the form of embodiment according to FIG. 8 can have similar contours or configurations as the belt ply according to FIG. 2 to 7.

It can be seen from FIG. 9 that the joint or connecting point between the ends of the sheet (10) of the belt ply (6), which ends have been placed in position to form a ring, extends according to a stepped line (25) so as to distribute the joint across a greater area. Instead of a stepped line (25), the joint can also extend along a straight line which, however, extends at an inclined angle relative to the longitudinal direction or circumferential direction of the belt ply (6).

It is shown in FIG. 10 that the belt ply (6) is formed by a plurality of continuously arranged rings (26) of a thin strip or sheet material. For the rest, these rings (26) can, however, be designed and constructed similarly to the sheets (10) in the exemplified embodiments described above.

Finally, FIG. 11 shows that the belt ply (6) can be formed by a strip (27) which is continuously wound to form a ring. The outermost layers of this winding are attached, via short welded seams (28), to adjacent windings, so as to prevent a separation of the winding.

I claim:

1. A tire having a belt ply, a carcass, and a tread surface, said belt ply comprising:

a ring of sheet material extending in the circumferential direction around the tire between the tread surface and the carcass, said ring having opposed edges and having transversely extending areas that are smooth and flat and extend continuously from one edge of the ring to the opposite edge of the ring, said ring being further formed with a plurality of circumferentially spaced extension zones comprising rows of projections, each row comprising individual projections each of which extends in a transverse direction relative to the circumference of the tire, each row being spaced from the circumferentially adjacent row by one of said smooth and flat areas, each row also being formed with openings between each projection to impart lateral flexibility to the ring in tile region of each row of projections.

2. The tire as claimed in claim 1, wherein the ring is formed of a sheet of synthetic material.

3. The tire as claimed in claim 1, wherein the ring is formed of a hard synthetic material having a thickness of 0.1 mm or less.

4. The tire as claimed in claim 1, wherein the ring is composed of sheet steel or sheet foil having a thickness of 0.1 mm or less.

5. The tire as claimed in claim 1, wherein the ring is formed of a composite material.

6. The tire as claimed in claim 1, wherein notches in the form of openings are formed in opposite transverse edges of the ring, said notches being spaced and extending circumferentially around the ring from the sides of the ring.

7. The tire as claimed in claim 1, wherein the ring is a continuous strip joined at the ends, and wherein the joint is inclined or in steps relative to a transverse line perpendicular to the axis of the strip.

8. The tire as claimed in claim 1, wherein the tire includes shoulder and flank portions, and wherein edge regions of the ring extend beyond the shoulder portions into the flank portions of the tire.

9. The tire as claimed in claim 1, further including a rubberized cord ply positioned between said belt ply and said tread surface.

10. The tire as claimed in claim 1, wherein the ply contains more than one ring.

11. The tire as claimed in claim 5, wherein the composite material includes threads or fibers.

* * * * *